United States Patent
Bates

(10) Patent No.: US 8,756,583 B2
(45) Date of Patent: Jun. 17, 2014

(54) THREAD-SPECIFIC EVENT MANAGEMENT IN A NON-STOP DEBUGGING ENVIRONMENT

(71) Applicant: International Business Machines Corporation, Armonk, NY (US)

(72) Inventor: Cary L. Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/674,235

(22) Filed: Nov. 12, 2012

(65) Prior Publication Data

US 2013/0074041 A1 Mar. 21, 2013

Related U.S. Application Data

(63) Continuation of application No. 13/033,925, filed on Feb. 24, 2011.

(51) Int. Cl.
*G06F 9/44* (2006.01)

(52) U.S. Cl.
USPC ........................................................ 717/129

(58) Field of Classification Search
USPC ........................................................ 717/129
See application file for complete search history.

(56) References Cited

U.S. PATENT DOCUMENTS

| | | | |
|---|---|---|---|
| 5,506,967 A | 4/1996 | Barajas et al. | |
| 5,632,032 A | 5/1997 | Ault et al. | |
| 6,113,645 A | 9/2000 | Benitz et al. | |
| 6,378,124 B1 * | 4/2002 | Bates et al. | 717/129 |
| 6,915,513 B2 | 7/2005 | Duesterwald et al. | |
| 7,020,871 B2 | 3/2006 | Bernstein et al. | |
| 7,178,145 B2 | 2/2007 | Bono | |
| 7,203,927 B2 | 4/2007 | Al-Azzawe et al. | |
| 7,774,787 B2 * | 8/2010 | Leino et al. | 718/107 |
| 7,779,390 B1 * | 8/2010 | Allavarpu et al. | 717/124 |
| 7,865,883 B1 * | 1/2011 | Sistare et al. | 717/129 |
| 7,992,133 B1 | 8/2011 | Theroux et al. | |
| 2002/0073401 A1 * | 6/2002 | Sangavarapu et al. | 717/129 |
| 2002/0124042 A1 | 9/2002 | Melamed et al. | |
| 2003/0009745 A1 | 1/2003 | Bates et al. | |
| 2003/0028862 A1 | 2/2003 | Bates et al. | |
| 2003/0131284 A1 | 7/2003 | Flanagan et al. | |
| 2005/0010678 A1 | 1/2005 | Pugh et al. | |
| 2005/0235264 A1 | 10/2005 | Hines | |
| 2005/0246691 A1 | 11/2005 | Hsieh et al. | |

(Continued)

OTHER PUBLICATIONS

Mark et al., "Debugging" chapter from "More iPhone Development," Apress, 2009, p. 495-526.*

(Continued)

*Primary Examiner* — Ryan Coyer
(74) *Attorney, Agent, or Firm* — Biggers Kennedy Lenart Spraggins LLP

(57) ABSTRACT

A non-stop debugging environment includes a debugger configured to debug a multi-threaded debuggee. In the non-stop debugging environment, encountering an event by one of the threads stops execution of only the one thread without concurrently stopping execution of the other threads. Thread-specific events may managed in the non-stop debug environment by identifying, by the debugger for a thread of execution of the debuggee not currently executing, a thread-specific event associated with the thread; removing, by the debugger, the thread-specific event for all threads of the debuggee; and upon the thread resuming execution, replacing, by the debugger, the thread-specific event.

6 Claims, 9 Drawing Sheets

(56) References Cited

U.S. PATENT DOCUMENTS

| | | | |
|---|---|---|---|
| 2006/0143531 | A1 | 6/2006 | Kilian et al. |
| 2007/0260929 | A1 | 11/2007 | Liu et al. |
| 2007/0288939 | A1* | 12/2007 | Stall .............................. 719/328 |
| 2008/0133977 | A1 | 6/2008 | Chun et al. |
| 2008/0134149 | A1 | 6/2008 | Bates et al. |
| 2009/0164976 | A1* | 6/2009 | Gritter et al. .................. 717/127 |
| 2009/0320001 | A1 | 12/2009 | Bates et al. |
| 2009/0327429 | A1 | 12/2009 | Hughes et al. |
| 2010/0064283 | A1 | 3/2010 | Pett |
| 2010/0205377 | A1 | 8/2010 | Moyer |
| 2010/0242026 | A1* | 9/2010 | Bates et al. ................... 717/128 |
| 2012/0198002 | A1 | 8/2012 | Goulart et al. |
| 2012/0210305 | A1 | 8/2012 | Bates |
| 2012/0222008 | A1 | 8/2012 | Bates |
| 2012/0266134 | A1 | 10/2012 | Bates |
| 2012/0266138 | A1 | 10/2012 | Bates |
| 2012/0266139 | A1 | 10/2012 | Bates |
| 2012/0266140 | A1 | 10/2012 | Bates |
| 2013/0067438 | A1 | 3/2013 | Bates |
| 2013/0074044 | A1 | 3/2013 | Bates |
| 2013/0097589 | A1 | 4/2013 | Bates |
| 2013/0097590 | A1 | 4/2013 | Bates |
| 2013/0097591 | A1 | 4/2013 | Bates |

OTHER PUBLICATIONS

Roberts et al., "Implementation and Evaluation of Data Breakpoint Schemes in an Interactive Debugger," Univ. of Utah, 1996, 96pg.*

Sidwell, et al., "Non-Stop Multi-Threaded Debugging in GDB", GCC Developers' Summit 2008, CodeSourcery Inc., Ottawa, Canada.

Mark, D., et al., "Debugging" Chapter From, "More iPhone 3 Development, Tackling iPhone SDK 3," 2009, pp. 495-526, Apress. Online ISBN: 978-1-4302-2506-5.

Roberts, P., "Implementation and Evaluation of Data Breakpoint Schemes in an Interactive Debugger," Master's Thesis, Jun./Dec. 1996, pp. 1-96, Department of Computer Science, University of Utah. URL: http://www.google.com/url?sa=t&rct=j&q=&esrc=s&source=web&cd=2&ved=0CDwQFjAB&url=http%3A%2F%2Fciteseerx.ist.psu.edu%2Fviewdoc%2Fdownload%3Fdoi%3D10.1.1.44.7562%26rep%3Drep1%26type%3Dpdf&ei=szJjUaOiHonn2AWI-4GQBA&usg=AFQjCNHZQ_R-GOciQPzkpe8xT0vf7Iyjxw&sig2=Tu8PX61jYYGiTmrE8Qju_w.

Harrow, Jr., J., "Runtime Checking of Multithreaded Applications with Visual Threads," K. Havelund, J. Penix, and W. Visser (Eds.): SPIN 2000, LNCS 1885, 2000, pp. 331-342, Springer-Verlag Berlin Heidelberg. URL: ftp://159.226.92.10/pub/netlib/spin/ws00/18850335.pdf.

Office Action, U.S. Appl. No. 13/028,269, Apr. 3, 2013.
Office Action, U.S. Appl. No. 13/674,165, Apr. 2, 2013.
Office Action, U.S. Appl. No. 13/033,925, Apr. 1, 2013.
Office Action, U.S. Appl. No. 13/674,235, Mar. 28, 2013.
Office Action, U.S. Appl. No. 13/085,725, Mar. 28, 2013.
Office Action, U.S. Appl. No. 13/674,397, Apr. 1, 2013.
Office Action, U.S. Appl. No. 13/085,628, Jun. 12, 2013.
Office Action, U.S. Appl. No. 13/692,065, Jun. 14, 2013.
Office Action, U.S. Appl. No. 13/693,235, Aug. 29, 2013.
Office Action, U.S. Appl. No. 13/693,802, Jun. 7, 2013.
Final Office Action, U.S. Appl. No. 13/085,725, Oct. 2, 2013.
Final Office Action, U.S. Appl. No. 13/028,269, Oct. 7, 2013.
Final Office Action, U.S. Appl. No. 13/033,925, Oct. 4, 2013.
Final Office Action, U.S. Appl. No. 13/674,165, Oct. 7, 2013.
Final Office Action, U.S. Appl. No. 13/674,397, Oct. 3, 2013.
Final Office Action, U.S. Appl. No. 13/085,467, Oct. 10, 2013.
Final Office Action, U.S. Appl. No. 13/085,628, Oct. 10, 2013.
Notice of Allowance, U.S. Appl. No. 13/086,073, Oct. 10, 2013.
Final Office Action, U.S. Appl. No. 13/692,065, Oct. 10, 2013.
Final Office Action, U.S. Appl. No. 13/693,802, Oct. 11, 2013.

* cited by examiner

THREAD-SPECIFIC EVENT MANAGEMENT IN A NON-STOP DEBUGGING ENVIRONMENT

CROSS-REFERENCE TO RELATED APPLICATION

This application is a continuation application of and claims priority from U.S. patent application Ser. No. 13/033,925, filed on Feb. 24, 2011.

BACKGROUND OF THE INVENTION

1. Field of the Invention

The field of the invention is data processing, or, more specifically, methods, apparatus, and products for thread-specific event management in a non-stop debugging environment.

2. Description of Related Art

Software source code is increasingly complex and execution of such software may be multi-threaded. Software development is evolving to provide enhanced methods of debugging multi-threaded software applications. In traditional debugging, an event encountered by any one thread stops execution of all threads of the multi-threaded solution. This form of debugging may be referred to as 'all-stop' debugging. in contrast to all-stop debugging, the enhanced multi-threaded debugging enables an event encountered by one thread to stop only that one thread's execution while all other threads remain executing. This form of debugging is referred to as non-stop debugging. Non-stop debugging is a bit of a misnomer, however, in that some threads actually do stop execution. The primary difference between non-stop and all stop debugging, is that in non-stop debugging execution of all threads of a multi-threaded program need not be stopped upon a single thread encountering an event, while in all-stop debugging execution of all threads is stopped upon a single thread of the multi-threaded application encountering an event. While non-stop debugging provides many benefits, non-stop debugging also presents many challenges.

SUMMARY OF THE INVENTION

Methods, apparatus, and products for thread-specific event management in a non-stop debugging environment are disclosed. The non-stop debugging environment includes a debugger configured to debug a debuggee that, in turn, includes a plurality of threads of execution. In the non-stop debugging environment, encountering an event by one of the threads stops execution of only the one thread without concurrently stopping execution of the other threads. Thread-specific event management in the non-stop debugging environment in accordance with embodiments of the present invention includes, identifying, by the debugger for a thread of execution of the debuggee not currently executing, a thread-specific event associated with the thread; removing, by the debugger, the thread-specific event for all threads of the debuggee; and, upon the thread resuming execution, replacing, by the debugger, the thread-specific event.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
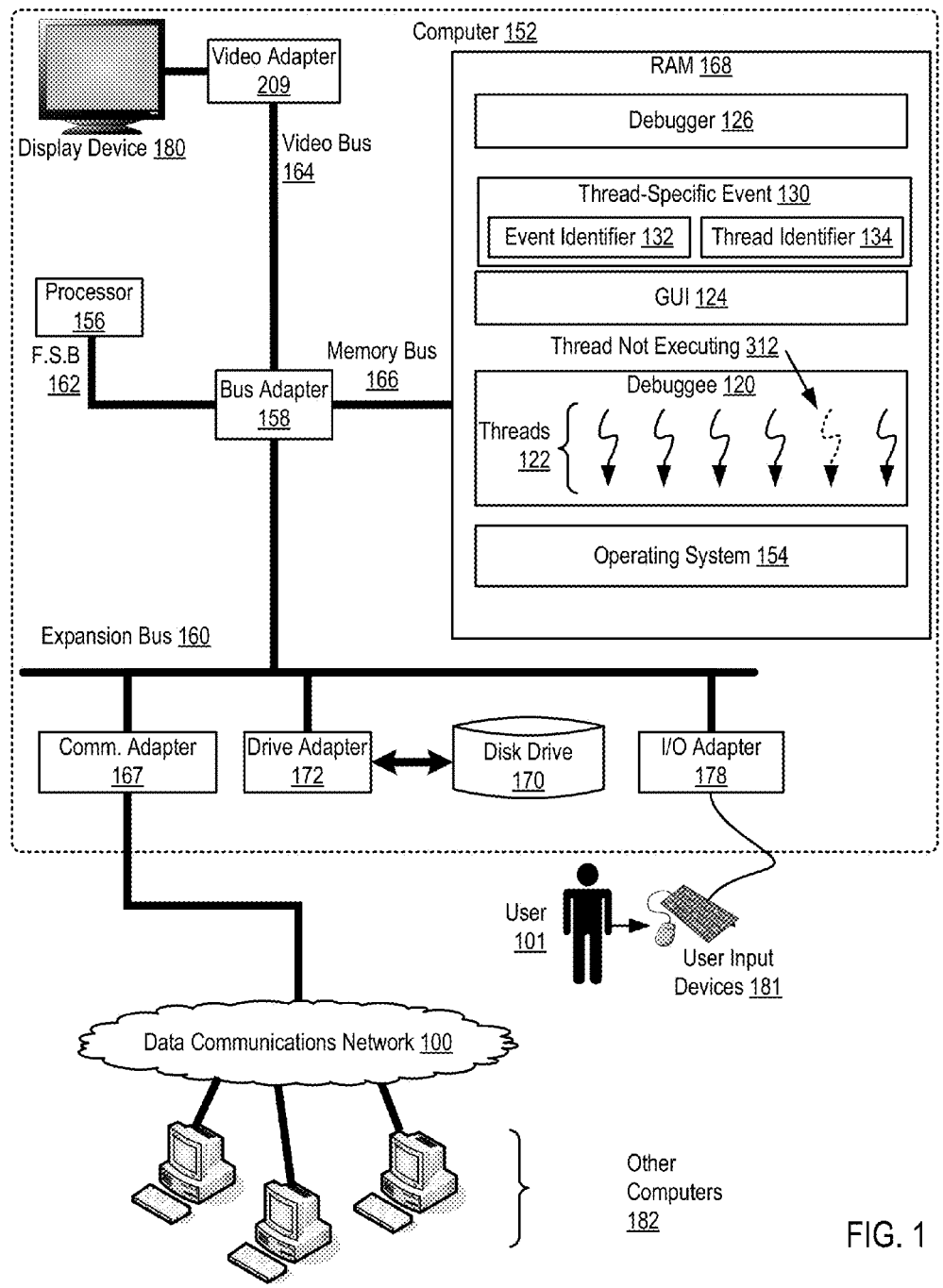
FIG. 1 sets forth a block diagram of a system for thread-specific event management in a non-stop debugging environment according to embodiments of the present invention.

Exemplary methods, apparatus, and products for thread-specific event management in a non-stop debugging environment in accordance with the present invention are described with reference to the accompanying drawings, beginning with FIG. 1. FIG. 1 sets forth a block diagram of a system for thread-specific event management in a non-stop debugging environment according to embodiments of the present invention. The system of FIG. 1 includes automated computing machinery comprising an exemplary computer (152) useful in thread-specific event management in a non-stop debugging environment according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) are a debugger (126) and a debuggee (120). A debugger (126) is an application that controls operation of another application—the debuggee (120)—for the purpose of testing execution of the debuggee. The source code of the debuggee may run on an instruction set simulator (ISS), a technique that allows great power in its ability to halt when specific conditions are encountered but which will typically be somewhat slower than executing the code directly on a processor for which the code is written. When execution of a program crashes or reaches a preset condition, a debugger typically displays the position in the source code at which the execution of the program crashed. A 'crash' occurs when the program cannot normally continue because of a programming bug. In addition to displaying a position in source code when execution of the source code crashes, debuggers also often offer other functions such as running a program step by step (single-stepping or program animation), stopping, breaking, or pausing the program to examine the current state, at some event or specified instruction by means of a breakpoint, and tracking the values of some variables.

In the example system of FIG. 1, the debugger (126) presents a graphical user interface (124) as a front-end of the debugger (126). Front-ends are extensions to debugger engines that provide Integrated Development Environment ('IDE') integration, program animation, and visualization features, rather than console-based command line interfaces. The 'front-end' directly faces a client—or user—in contrast to the debugger (126) in the example of FIG. 1, which interfaces indirectly with the clients through the GUI (126).

In the example system of FIG. 1, the debuggee (120) is a software application that executes as a process containing a number of threads (122) of execution. A 'thread' of execution as the term is used here refers to the smallest unit of processing that can be scheduled by an operating system. A thread generally results from a fork of a computer program into two or more concurrently running threads. The implementation of threads and processes differs from one operating system to another, but in most cases, a thread is contained inside a process. Multiple threads can exist within the same process and share resources such as memory, while different processes do not share these resources. In particular, the threads of a process share the process's computer program instructions and its context—the values that the process's variables reference at any given moment.

The system of FIG. 1 includes a non-stop debugging environment that includes the debugger (126) and the debuggee (120). The debugger supports non-stop debugging by insuring that when one thread of a multi-threaded debuggee encounters an event, execution of only that one of threads stops, without concurrently stopping execution of other threads. Consider, for example, a multi-threaded debuggee that includes three threads. In a non-stop debug environment, when one of the threads encounters an event, execution of that thread is stopped, but execution of the remaining two threads continues unabated. Either of other two threads may then separately encounter an event, stopping execution of that thread, but no other thread. By contrast, a traditional all-stop debugging environment insures that all threads are stopped concurrently with any one thread encountering an event. Continuing with the above example of a triple threaded debuggee, when any one of the three threads encounters an event in a traditional all-stop debug environment, all three threads halt execution.

An event is a predefined occurrence during execution of a debuggee. Examples of events which may be encountered during execution of the debuggee include breakpoints, watchpoints, catchpoints, and the like. A breakpoint is a specification of a source code location at which a debuggee will pause or stop execution. A watchpoint is a breakpoint configured to pause or stop execution of the debuggee when a value of a particular expression changes. A catchpoint is another type of breakpoint configured to pause or stop execution of the debuggee when a specified event occurs such as the throwing of an exception or a load of a library, and so on.

In addition to supporting non-stop debugging generally, the debugger (126) in the example of FIG. 1 is also configured for thread-specific event management in a non-stop debugging environment in accordance with embodiments of the present invention. Thread-specific event management in accordance with embodiments of the present invention includes identifying, by the debugger (126) for a thread of execution of the debuggee (120) not currently executing, a thread-specific event (130) associated with the thread; removing, by the debugger (126), the thread-specific event for all threads (122) of the debuggee (120); and, upon the thread resuming execution, replacing, by the debugger (126), the thread-specific event (130).

A thread may stop execution for various reasons. A thread, for example, may encounter an event—thread-specific or otherwise, be in a wait state, or be stopped at the behest of a user. A thread may be in a wait state for various reasons including for example, waiting on a lock restricting access to a resource to become available, waiting on an I/O activity to complete, or for other reasons as will occur to readers of skill in the art.

A thread-specific event is an event—a breakpoint, watchpoint, catchpoint or the like—associated with a particular, specified thread. By contrast, consider that non-thread-specific events are not associated with any one thread. Instead, a non-thread-specific event is applied to and processed for all threads in the same manner. Further, a thread-specific event may also be configured such that the debugger (126) ignores an encounter of the event except for encounters by the thread associated with the thread-specific event. The debugger may 'ignore' an encounter of an event by a thread, by immediately resuming execution of that thread. Consider, for example, two threads: Thread_1 and Thread_2. Consider further that Thread_1 is associated with a breakpoint at line 23. The debugger may, upon discovering that Thread_2 encountered the breakpoint at line 23, determine that the breakpoint is a thread-specific breakpoint associated with Thread_1 and immediately resume execution of Thread_2. From a user's perspective, then, the encounter of the breakpoint at line 23 by Thread_2 never occurred.

In the example of FIG. 1, the thread-specific event (130) associated with thread (312) not currently executing is represented by an event identifier (132) associated with a thread identifier (134). In other embodiments, the debugger (126) may maintain a table or other data structure including a plurality of records, each of which represents a thread-specific event and is implemented with an association of a thread identifier and an event identifier.

Also stored in RAM (168) is an operating system (154). Operating systems useful in computer systems that support thread-specific event management in a non-stop debugging environment according to embodiments of the present invention include UNIX™ Linux™ Microsoft XP™ AIX™ IBM's i™, and others as will occur to those of skill in the art. The operating system (154), debugger (126), debuggee (126), and GUI (124) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computer systems that support thread-specific event management in a non-stop debugging environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user (101) input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computer systems that support thread-specific event management in a non-stop debugging environment according to embodiments of the present invention include modems for wired dial-up communications, Ethernet (IEEE 802.3) adapters for wired data communications network communications, and 802.11 adapters for wireless data communications network communications.

The arrangement of computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
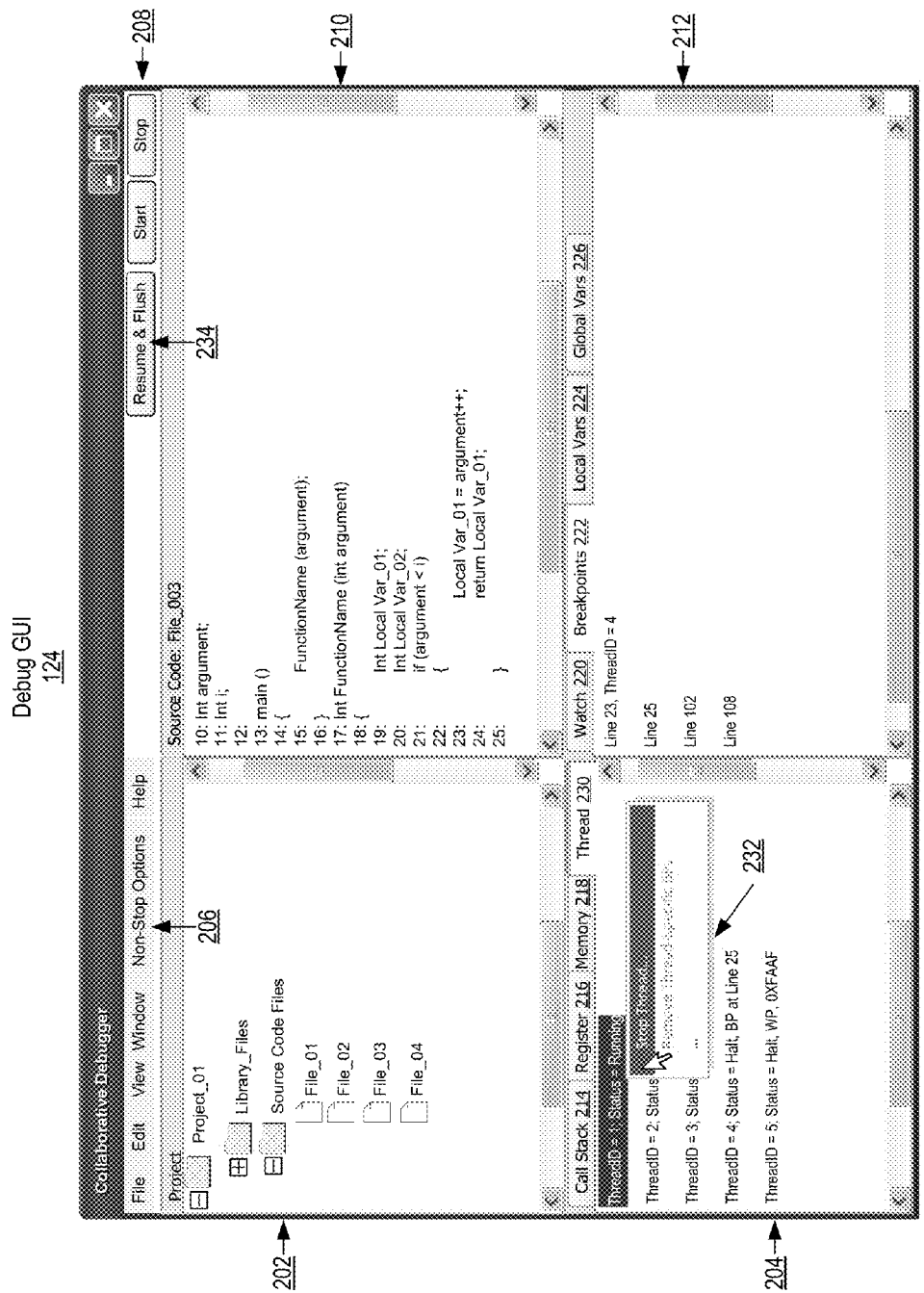
FIG. 2 sets forth an example non-stop debugging GUI presented to a user in accordance with embodiments of the present invention.

For further explanation, FIG. 2 sets forth an example non-stop debugging GUI (124) presented to a user in accordance with embodiments of the present invention. The example GUI (124) of FIG. 2 provides an interface for a user to control operation of a debugger that supports non-stop debugging. The debugger presenting the example GUI (124) of FIG. 2 is configured to debug a multi-threaded debuggee. That is, the debugger presenting the example GUI (124) of FIG. 2 and the multi-threaded debuggee form a non-stop debugging environment.

The example GUI (124) of FIG. 2 includes a menu bar (208) that, in turn, includes a number of separate menus: a File menu, an Edit menu, a View menu, a Non-Stop Options menu, and a Help menu. The Non-Stop Options menu (206), when selected, may provide a user with various menu items that support non-stop debugging.

The example GUI (124) of FIG. 2 also includes several independent portions—called panes (as in 'window panes') for clarity of explanation—a project pane (202), a source code pane (210), and two separate data panes (204, 212). Project pane (202) presents the files and resources available in a particular software development project. Source code pane (210) presents the source code of the multi-threaded debuggee. The data panes (204, 212) present various data useful in debugging the source code. In the example of FIG. 2, data pane (204) includes four tabs, each of which presents different data: a call stack tab (214), a register tab (214), a memory tab (218), and a thread tab (230). Data pane (212) includes four tabs: a watch list tab (220), a breakpoints (222) tab, a local variable tab (224), and a global variable tab (226).

The GUI (124) of FIG. 2 may support thread-specific event management in accordance with embodiments of the present invention. For example, the breakpoints tab (222) depicted in pan (212) sets forth three breakpoints, one of which is a thread-specific breakpoint. The GUI (124) depicts breakpoints at line 23, line 102, and line 108. The breakpoint at line 23 is associated with a thread having a thread identifier of '4.' When a thread having an identifier other than '4' encounters the breakpoint the debugger presenting the example GUI of FIG. 2 will immediately resume execution of the thread, likely without notifying the user. Although the resumption of execution may be quick, readers will recognize that any stoppage of thread execution reduces performance of the debuggee.

Also, the thread tab (230) of the pane (204) in the example GUI (124) of FIG. 2 depicts a listing of threads and each thread's present status. For example, the thread tab (230) depicts a thread having an identifier of '1' as presently running and a thread having an identifier of '4' as halted upon encountering a breakpoint at line 25. The debugger presenting the example GUI (124) of FIG. 2 may operate for thread-specific event management by identifying, for the thread of execution not currently executing (thread ID='4'), a thread-specific event associated with the thread (breakpoint at line 23) and removing the thread-specific event for all threads of the debuggee. Said another way, once the thread 4 stops executing, the debugger removes the breakpoint at line 23—a breakpoint associated only with thread 4—from all threads, and no thread can encounter the breakpoint. In this way, the debugger reduces performance degradation.

In some embodiments, the user may selectively stop execution of a thread or remove thread-specific events from a non-executing thread. In the GUI (124) of FIG. 2, for example, a user may select a thread in the thread tab (230), and select, from a drop-down selection list, an option to stop the selected thread's execution or remove thread-specific breakpoints associated with the selected thread. In the example of FIG. 2, the user has selected the thread having an identifier of 1 and is presented an option to stop execution of the thread. The option to remove the thread's thread-specific breakpoints, however, is disabled as the thread is currently executing. Once execution of the thread is stopped, however, the user may opt to remove thread-specific breakpoints from all threads.

The GUI items, menus, window panes, tabs, and so on depicted in the example client-specific GUI (124) of FIG. 2, are for explanation, not for limitation. Other GUI items, menu bar menus, drop-down menus, list-boxes, window panes, tabs, and so on as will occur to readers of skill in the art may be included in client-specific GUIs presented by debug clients in a distributed system in which collaborative software debugging is carried out in accordance with embodiments of the present invention.

Figure 3:
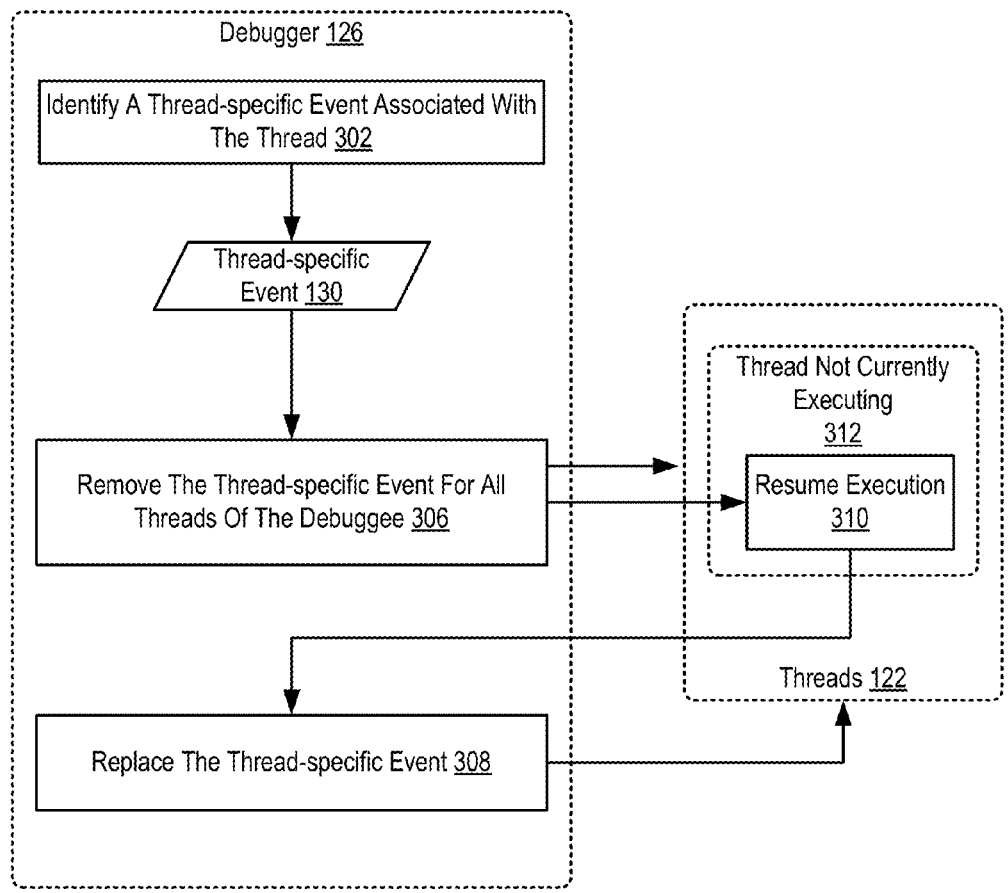
FIG. 3 sets forth a flow chart illustrating an exemplary method for thread-specific event management in a non-stop debugging environment according to embodiments of the present invention.

For further explanation, FIG. 3 sets forth a flow chart illustrating an exemplary method for thread-specific event management in a non-stop debugging environment according to embodiments of the present invention. The method of FIG. 3 is carried out in a non-stop debugging environment that includes a debugger (126) configured to debug a debuggee. The debuggee includes a plurality of threads (122) of execution. In the non-stop debugging environment, encountering an event by one of the threads stops execution of only the one thread without concurrently stopping execution of the other threads.

The method of FIG. 3 also includes identifying (302), by the debugger (126) for a thread (312) of execution of the debuggee not currently executing, a thread-specific event (130) associated with the thread (312). Identifying (302) a thread-specific event (130) associated with the thread (312) may be carried out in various ways including, for example, by searching a table of thread specific events maintained by the debugger for any records containing events associated with the thread's (312) identifier.

The method of FIG. 3 also includes removing (306), by the debugger (126), the thread-specific event (130) for all threads (122) of the debuggee. Removing the thread-specific event may be carried out by replacing, at the memory location of the event, the original operational code (opcode). Breakpoints, for example, may be inserted into source code by replacing an original opcode of a computer program instruction at a memory location of the thread's source code with another predefined opcode that, when executed, creates an exception or interrupt handled by the debugger. The original opcode, during this replacement, is stored at a predefined location so that the opcode may be replaced at the memory location if the breakpoint is disabled. Removing the thread-specific event, therefore, may be carried out by replacing the predefined opcode with the original opcode.

Upon the thread (31) resuming (310) execution, the method of FIG. 3 continues by replacing (308), by the debugger, the thread-specific event (130). Replacing (308) the thread-specific event (130) may be carried out by replacing the original opcode at the memory location in source code of each thread with the predefined opcode that when executed causes an exception or interrupt handled by the debugger.

Figure 4:
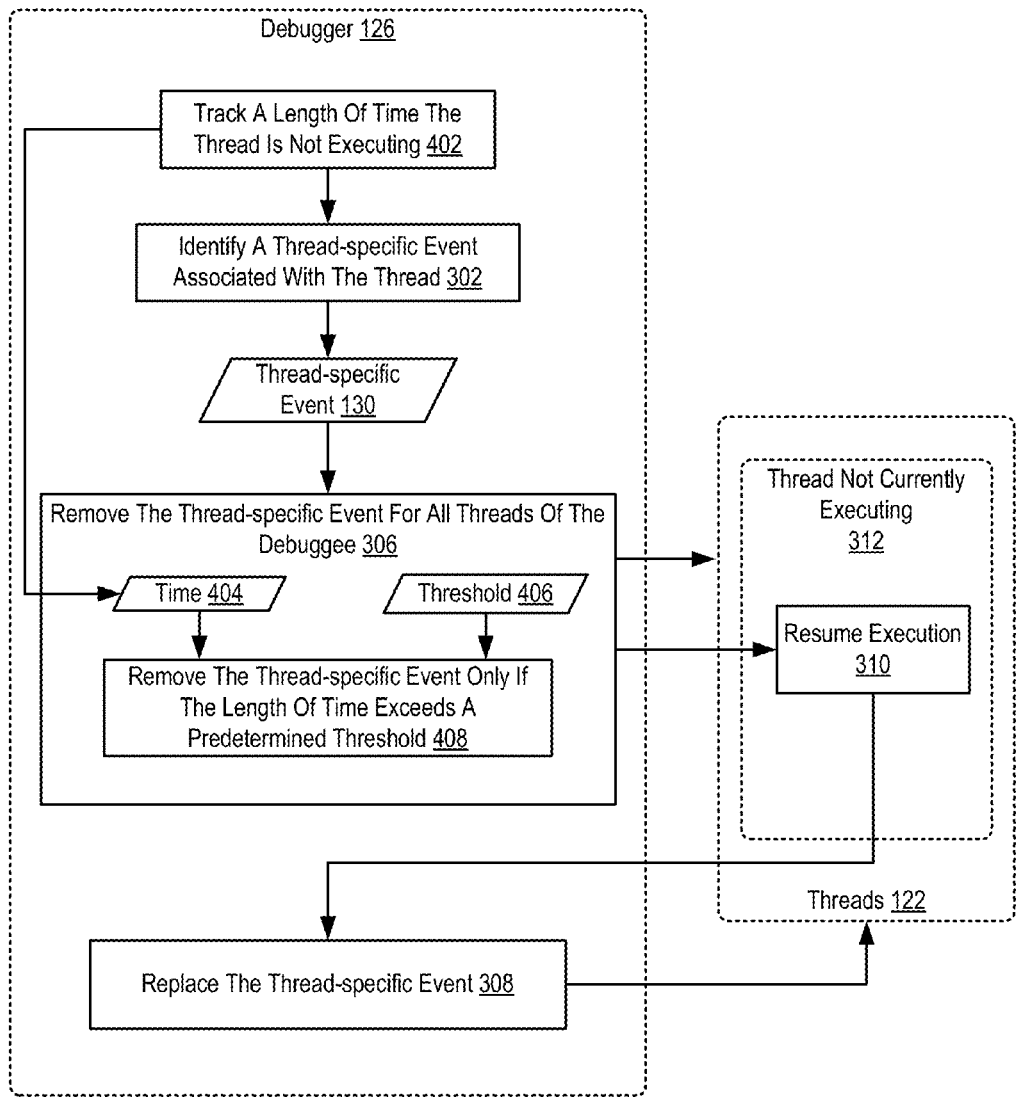
FIG. 4 sets forth a flow chart illustrating a further exemplary method for thread-specific event management in a non-stop debugging environment according to embodiments of the present invention.

For further explanation, FIG. 4 sets forth a flow chart illustrating a further exemplary method for thread-specific event management in a non-stop debugging environment according to embodiments of the present invention. The method of FIG. 4 is similar to the method of FIG. 3 in that the method of FIG. 4 is carried out in a non-stop debugging environment that includes a debugger (126) configured to debug a multi-threaded (122) debuggee, where the debugger (126) identifies (302) for a thread (312) of execution not currently executing a thread-specific event (130) associated with the thread (312); removes (306) the thread-specific event for all threads (122), and, upon the thread resuming (310) execution, replaces (308) the thread-specific event (130).

The method of FIG. 4 differs from the method of FIG. 3, however, in that the method of FIG. 4 includes tracking (402) a length of time (404) the thread (312) is not executing. In the method of FIG. 4, removing (306) the thread-specific event is carried out by removing (408) the thread-specific event (310) only if the length of time (404) exceeds a predetermined threshold (406). In this way, a debugger may be configured to reduce impact of encountering thread-specific events by threads other than the thread associated with the thread-specific event, not on every stop of a thread, but rather when the thread is stopped for some threshold amount of time. This configuration may insure that thread-specific event removals are performed only when beneficial to reducing the impact caused non-essential thread-specific event encounters.

Figure 5:
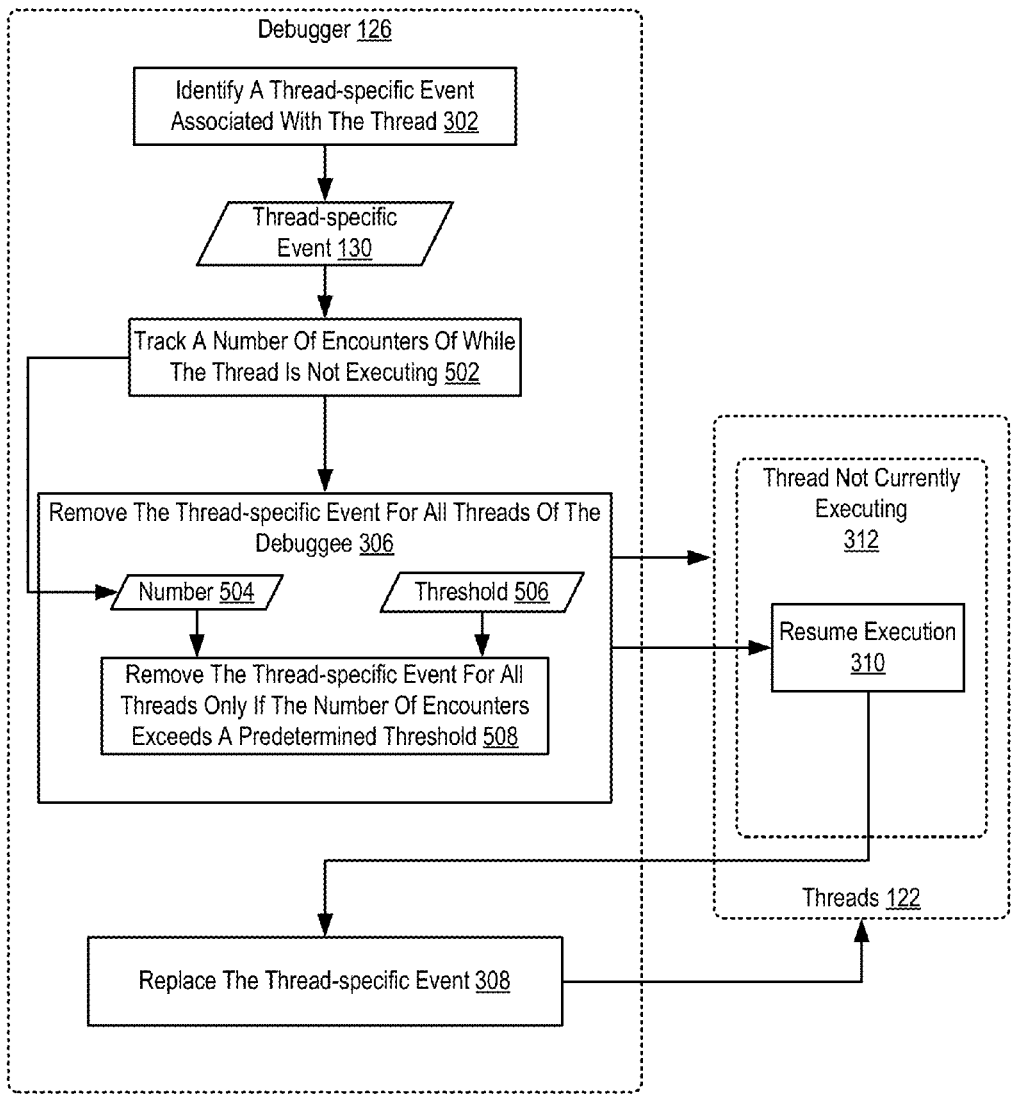
FIG. 5 sets forth a flow chart illustrating a further exemplary method for thread-specific event management in a non-stop debugging environment according to embodiments of the present invention.

For further explanation, FIG. 5 sets forth a flow chart illustrating a further exemplary method for thread-specific event management in a non-stop debugging environment according to embodiments of the present invention. The method of FIG. 5 is similar to the method of FIG. 3 in that the method of FIG. 5 is carried out in a non-stop debugging environment that includes a debugger (126) configured to debug a multi-threaded (122) debuggee, where the debugger (126) identifies (302) for a thread (312) of execution not currently executing a thread-specific event (130) associated with the thread (312); removes (306) the thread-specific event for all threads (122), and, upon the thread resuming (310) execution, replaces (308) the thread-specific event (130).

The method of FIG. 5 differs from the method of FIG. 3, however, in that the method of FIG. 5 includes tracking (502) a number (504 of encounters of the thread-specific event (130) while the thread (312) is not executing. In the method of FIG. 5, removing (306) the thread-specific event (130) for all threads of the debuggee is carried out by removing (508) the thread-specific event (130) for all threads (122) only if the number (504) of encounters exceeds a predetermined threshold (508). In this way, the debugger may be configured to allow a predefine number of encounters before removing the thread-specific event. Again, like the method of FIG. 4, the method of FIG. 5 enables the debugger to reduce the impact of non-essential thread-specific event encounters only when beneficial to do so—when the number of actual encounters represents an undesirable impact.

As mentioned above, a thread may stop execution for various reasons. For further explanation, therefore, FIG. 6 sets forth a flow chart illustrating a further exemplary method for thread-specific event management in a non-stop debugging environment according to embodiments of the present invention in which the execution of a thread is stopped at the behest of a user. The method of FIG. 6 is similar to the method of FIG. 3 in that the method of FIG. 6 is carried out in a non-stop debugging environment that includes a debugger (126) configured to debug a multi-threaded (122) debuggee, where the debugger (126) identifies (302) for a thread (312) of execution not currently executing a thread-specific event (130) associated with the thread (312); removes (306) the thread-specific event for all threads (122), and, upon the thread resuming (310) execution, replaces (308) the thread-specific event (130).

Figure 6:
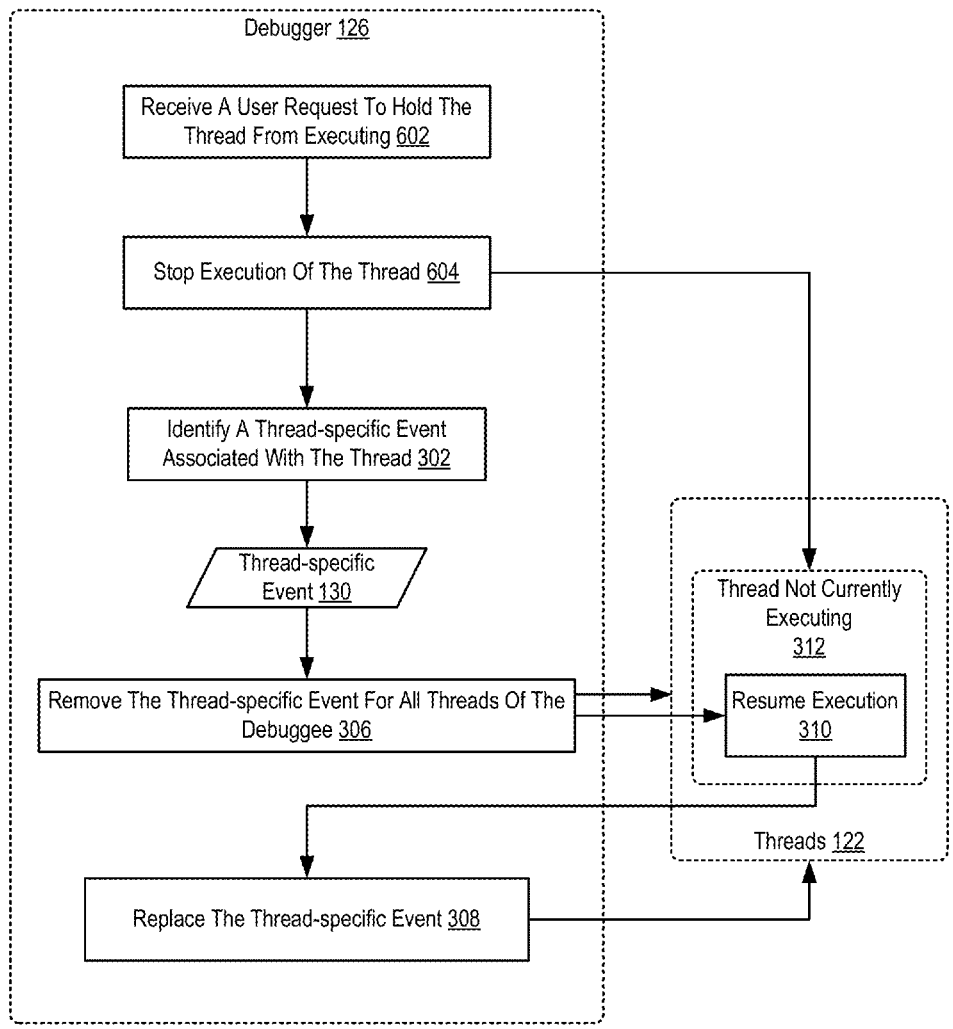
FIG. 6 sets forth a flow chart illustrating a further exemplary method for thread-specific event management in a non-stop debugging environment according to embodiments of the present invention.

The method of FIG. 6 differs from the method of FIG. 3, however, in that the method of FIG. 6 also includes receiving (602) a user request to hold the thread (312) from executing and stopping (604) execution of the thread. A user may request to hold the thread from executing in various ways including, for example, via interaction with a GUI presented by the debugger (126). Consider, for example, the GUI (124) in the example of FIG. 2 in which a user is presented an option in a drop-down selection list to stop a thread from executing.

Figure 7:
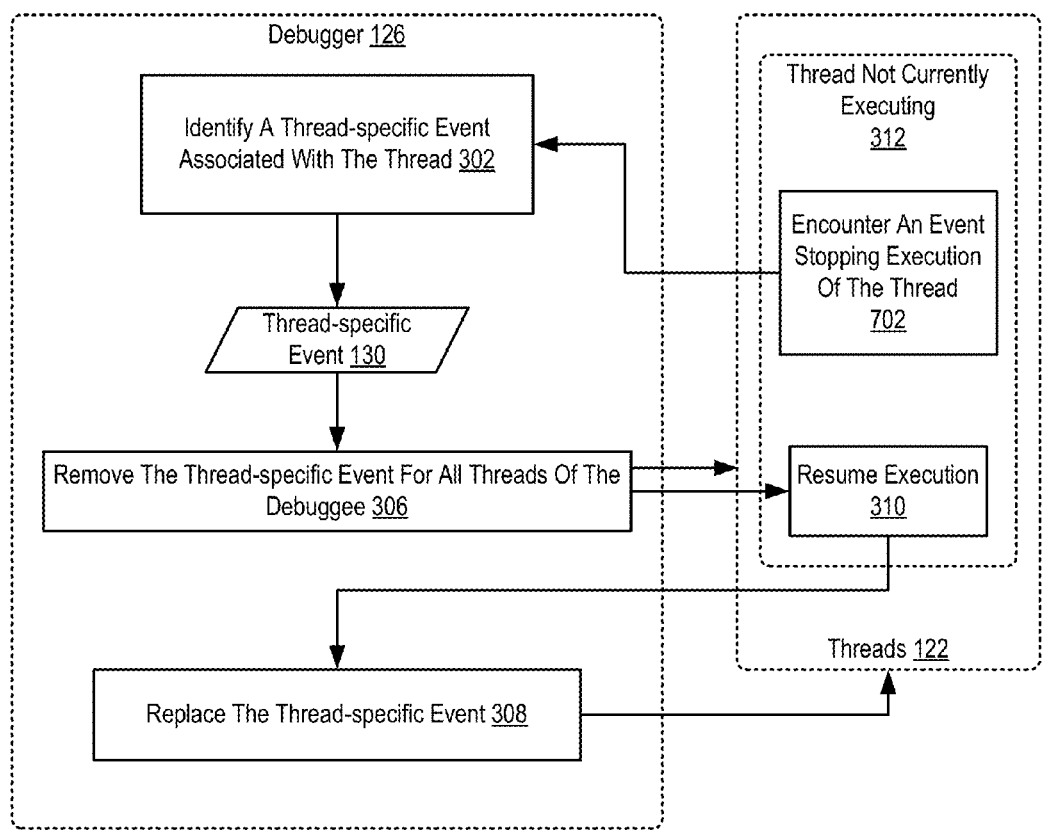
FIG. 7 sets forth a flow chart illustrating a further exemplary method for thread-specific event management in a non-stop debugging environment according to embodiments of the present invention.

FIG. 7 presents another example in which a thread's execution is stopped. For further explanation, FIG. 7 sets forth a flow chart illustrating a further exemplary method for thread-specific event management in a non-stop debugging environment according to embodiments of the present invention in which execution of a thread is stopped upon encountering an event. The method of FIG. 7 is similar to the method of FIG. 3 in that the method of FIG. 7 is carried out in a non-stop debugging environment that includes a debugger (126) configured to debug a multi-threaded (122) debuggee, where the debugger (126) identifies (302) for a thread (312) of execution not currently executing a thread-specific event (130)

associated with the thread (312); removes (306) the thread-specific event for all threads (122), and, upon the thread resuming (310) execution, replaces (308) the thread-specific event (130).

The method of FIG. 7 differs from the method of FIG. 3, however, in that the method of FIG. 7 includes encountering (702), by the thread (312), an event stopping execution of the thread. The event encountered by the thread (312) may be a thread-specific event or any event. Readers will recognize that the benefit of removing a thread-specific event associated with the thread (312) from all threads (122) may be realized without regard to the nature of the event encountered by the stopped thread (312).

Figure 8:
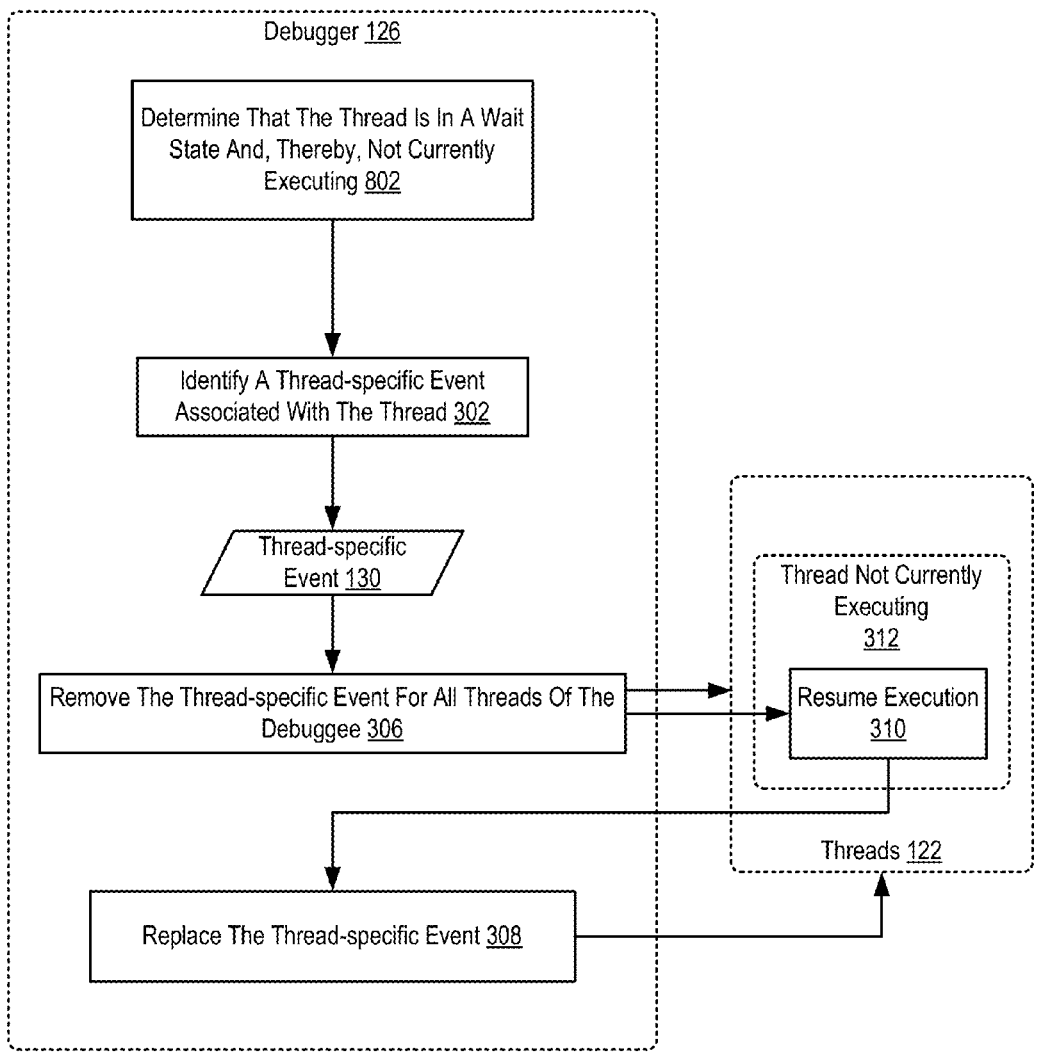
FIG. 8 sets forth a flow chart illustrating a further exemplary method for thread-specific event management in a non-stop debugging environment according to embodiments of the present invention.

For further explanation, FIG. 8 sets forth a flow chart illustrating a further exemplary method for thread-specific event management in a non-stop debugging environment according to embodiments of the present invention. The method of FIG. 8 is similar to the method of FIG. 3 in that the method of FIG. 8 is carried out in a non-stop debugging environment that includes a debugger (126) configured to debug a multi-threaded (122) debuggee, where the debugger (126) identifies (302) for a thread (312) of execution not currently executing a thread-specific event (130) associated with the thread (312); removes (306) the thread-specific event for all threads (122), and, upon the thread resuming (310) execution, replaces (308) the thread-specific event (130).

The method of FIG. 8 differs from the method of FIG. 3, however, in that the method of FIG. 8 also includes determining (802) that the thread is in a wait state and, thereby, not currently executing. In the method of FIG. 8, the thread (312) is considered to be 'not currently executing' although no mechanism may be actively stopping execution of the thread. Consider, by contrast, a breakpoint that causes an interrupt of the thread's execution that is handled by the debugger (126). With such a breakpoint encounter, the thread is actively held from executing until the debugger causes the thread to resume execution. While in a wait state, however, the thread is not actively held from execution, but rather the thread is passively not executing. The thread may be in a wait state for various reasons including, for example, by waiting on a lock, such as a mutex or a semaphore, to become available, waiting on an I/O request to complete, waiting on a predefined time slice or 'quant' of time to complete so that execution continues, and so on as will occur to readers of skill in the art.

Figure 9:
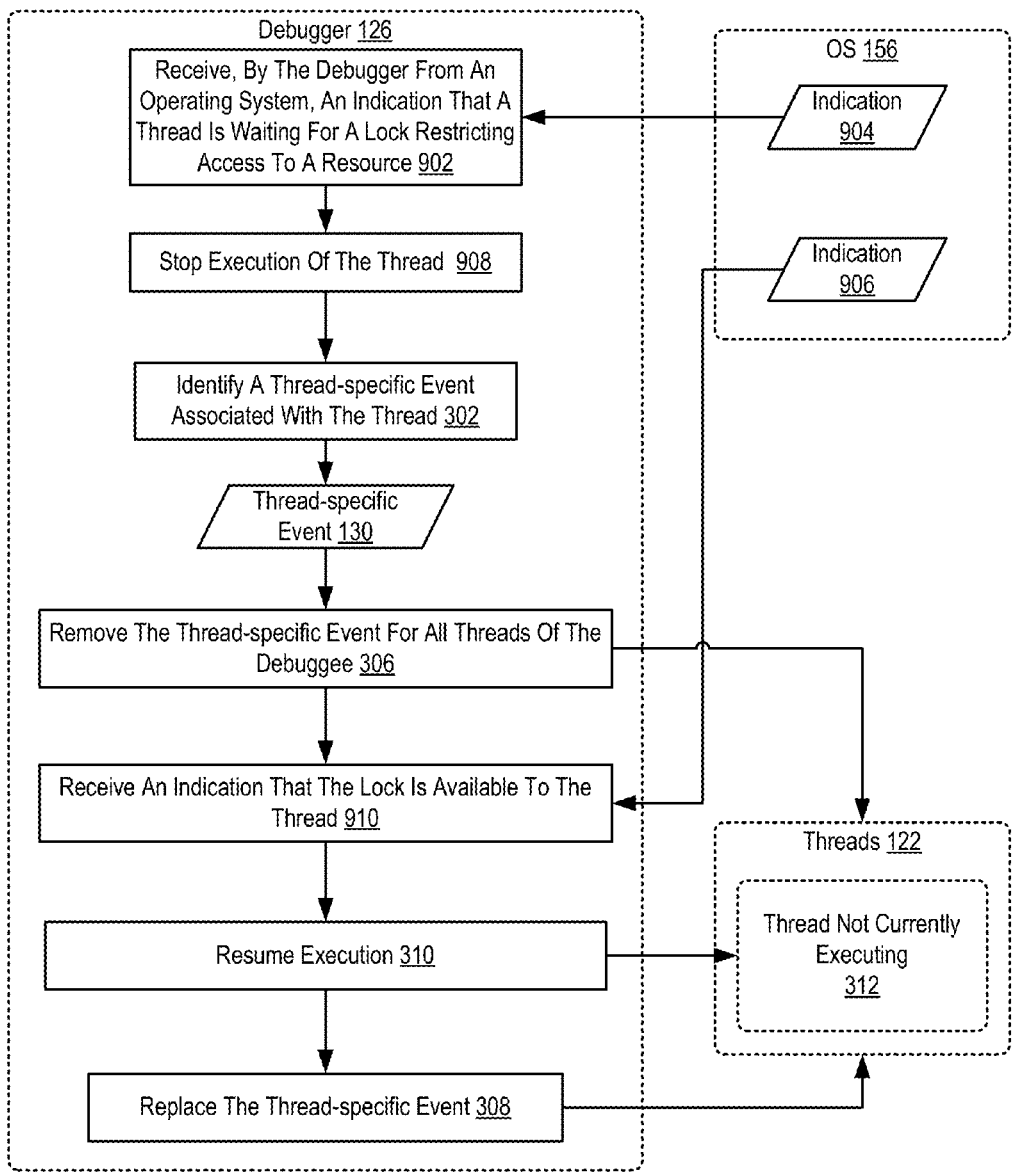
FIG. 9 sets forth a flow chart illustrating a further exemplary method for thread-specific event management in a non-stop debugging environment according to embodiments of the present invention.

For further explanation, FIG. 9 sets forth a flow chart illustrating a further exemplary method for thread-specific event management in a non-stop debugging environment according to embodiments of the present invention. The method of FIG. 9 is similar to the method of FIG. 3 in that the method of FIG. 9 is carried out in a non-stop debugging environment that includes a debugger (126) configured to debug a multi-threaded (122) debuggee, where the debugger (126) identifies (302) for a thread (312) of execution not currently executing a thread-specific event (130) associated with the thread (312); removes (306) the thread-specific event for all threads (122), and, upon the thread resuming (310) execution, replaces (308) the thread-specific event (130).

The method of FIG. 9 differs from the method of FIG. 3, however, in that the method of FIG. 9 includes receiving (902), by the debugger (126) from an operating system (156), an indication that the thread (312) is waiting for a lock restricting access to a resource and stopping (908), by the debugger (126), execution of the thread. A lock as the term is used here refers to an operating system supported lock, such as a mutex or semaphore. The term 'resource' may refer to any resource—methods, object, variables, I/O devices, a data communications bus a processor register, a memory location, and so on as will occur to readers of skill in the art. The debugger (126) may receive an indication (904) that the thread (312) is waiting for a lock in various ways including, by requesting the status of the thread from the operating system or through use of ptrace-type calls into the operating system for following the operation of the operating system process responsible for maintaining a lock.

At a time after removing the thread-specific event for all threads of the debuggee, the method of FIG. 9 continues by receiving (910), by the debugger from the operating system (156), an indication (906) that the lock is available to the thread and resuming (310), by the debugger (126), execution of the thread.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of thread-specific event management in a non-stop debugging environment, the non-stop debugging environment comprising a debugger configured to debug a debuggee comprising a plurality of threads of execution, wherein encountering an event by one of the threads stop execution of only the one thread without concurrently stopping execution of the other threads, the method comprising:
   identifying, by the debugger for a thread of execution of the debuggee not currently executing, a thread-specific event associated with the thread, wherein the thread specific event comprises predefined operation code previously inserted into original operational code for the thread of execution;
   tracking a length of time the thread is not executing;
   in response to determining that the length of time exceeds a predetermined threshold, removing, by the debugger, the thread-specific event for all threads of the debuggee while the thread of execution associated with the thread-specific event is not currently executing; and
   upon the thread resuming execution, replacing, by the debugger, the thread-specific event.

2. The method of claim 1 further comprising tracking a number of encounters of the thread-specific event while the thread is not executing, wherein removing the thread-specific event for all threads of the debuggee further comprises removing the thread-specific event for all threads only if the number of encounters exceeds a predetermined threshold.

3. The method of claim 1, further comprising:
   receiving a user request to hold the thread from executing; and
   stopping execution of the thread.

4. The method of claim 1, further comprising encountering, by the thread, an event stopping execution of the thread.

5. The method of claim 1, further comprising determining that the thread is in a wait state and, thereby, not currently executing.

6. The method of claim 1 further comprising:
   receiving, by the debugger from an operating system, an indication that the thread is waiting for a lock restricting access to a resource;
   stopping, by the debugger, execution of the thread;
   at a time after removing the thread-specific event for all threads of the debuggee:
   receiving, by the debugger from the operating system, an indication that the lock is available to the thread; and
   resuming, by the debugger, execution of the thread.

* * * * *